June 10, 1947. H. L. TIGER 2,422,054
METHOD OF AND APPARATUS FOR TREATING AQUEOUS SOLUTION OF ELECTROLYTES
Filed Dec. 9, 1942 2 Sheets-Sheet 1
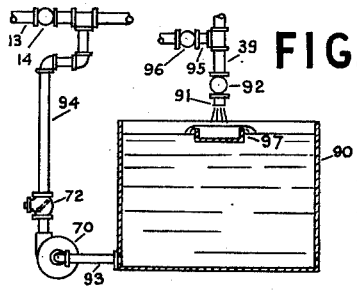
FIG.3
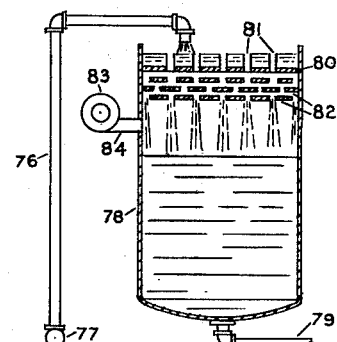
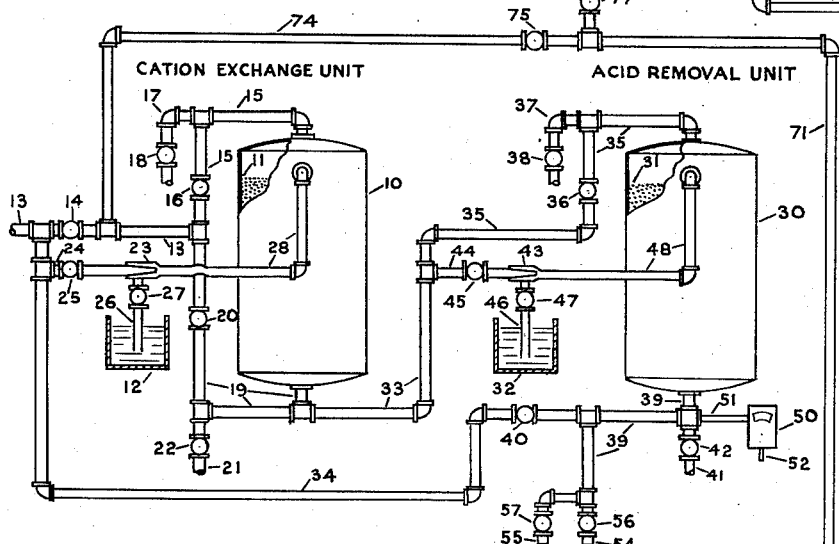
FIG.1
FIG.2
HOWARD L. TIGER
INVENTOR.
BY *Eric Pick*
ATTORNEY June 10, 1947. H. L. TIGER 2,422,054
METHOD OF AND APPARATUS FOR TREATING AQUEOUS SOLUTION OF ELECTROLYTES
Filed Dec. 9, 1942 2 Sheets-Sheet 2

HOWARD L. TIGER
INVENTOR.

BY *Eric Pink*
ATTORNEY

Patented June 10, 1947

2,422,054

UNITED STATES PATENT OFFICE 2,422,054

METHOD OF AND APPARATUS FOR TREATING AQUEOUS SOLUTION OF ELECTROLYTES

Howard L. Tiger, Hewlett, N. Y., assignor to The Permutit Company, New York, N. Y., a corporation of Delaware Application December 9, 1942, Serial No. 468,348

14 Claims. (Cl. 210—24)

This invention relates to a method of and apparatus for treating an aqueous solution of electrolytes; and it comprises removing electrolytes from such solution by successive and repeated passage of predetermined volumes of the solution through a cation exchange unit and an acid removal unit, and regenerating said units from time to time, preferably subsequently to the first passage and prior to the last passage of one of said volumes of solution; all as more fully set forth hereinafter and as claimed.

One of the more recently developed methods of purifying an aqueous solution of electrolytes is by the use of two different regenerative materials operated in series for the purpose of demineralizing the solution, i. e. removing electroytes from it. The solution to be treated is first passed through a bed of granular cation exchange material charged with hydrogen ions and thence through a bed of granular anion exchange or acid removal material charged with hydroxyl ions. On passing through the cation exchange material the metallic cations of the salts contained in the solution to be treated are exchanged for hydrogen ions so that the solution then contains free mineral acids such as hydrochloric, sulfuric, carbonic and other acids formed with whatever anions are present in the solution undergoing treatment. Upon passage of this acid solution through the bed of acid removal material the free mineral acids are removed; the carbonic acid, which is not absorbed by the acid removal material to any appreciable extent, may be eliminated by the simple expedient of aeration if $CO_2$ is undesirable in the use to which the treated solution is to be subjected.

The best way of carrying out this process of demineralizing is to place a bed of each of the ion exchange materials into a tank provided with the valves and connections required to control flow through the tanks.

The ion exchange materials used in this method of electrolyte removal become exhausted after a certain extent of use, and they must then be recharged with the kind of ion serving their particular purpose. To this end, the cation exchange material is regenerated with dilute acid, such as sulfuric or hydrochloric acid, while the acid removal material is regenerated with the dilute solution of an alkali, such as caustic soda, soda ash, sodium bicarbonate, ammonium hydroxide or the like. After regeneration the ion exchange materials must be freed by rinsing of excess regenerant and the products resulting from the regenerating reactions.

For many uses, such as the treatment of water for various manufacturing purposes and for feeding high pressure boilers, it is desirable that the treated solution should contain no more than a few parts per million of total dissolved electrolytes. By a single passage of the solution through cation exchange and acid removal material, an effluent meeting such rigorous specifications can, as a rule, not be obtained at all, or at best only in relatively small quantities, if the solution to be treated contains large amounts of sulfates and chlorides. In an attempt to solve this problem the suggestion has been made in the patent to Riley No. 2,267,841, dated Dec. 30, 1941, to recycle a portion of the demineralized solution discharged by the acid removal unit during normal service, mixing this recycled solution with the raw solution supplied to the cation exchange unit. In this manner more complete electrolyte removal is obtained than by single passage operation since such recycling dilutes the raw solution with a solution from which the major proportion of dissolved electrolytes has been removed, so that the solution supplied to the cation exchange unit has an electrolyte content substantially lower than that of the raw solution. While this process of recycling a portion of the effluent improves matters considerably, it is still not an altogether satisfactory solution of the problem because not all of the available capacity of the cation exchange and acid removal materials can be utilized since the run must be interrupted and the units regenerated as soon as the concentration of electrolytes in the effluent exceeds the predetermined limit. Furthermore, to meet exacting specifications the major portion of the effluent must be recycled, making the apparatus relatively large and expensive.

It is an object of this invention to provide a method of and apparatus for demineralizing a solution so thoroughly as to meet the most rigorous requirements, regardless of the concentration of electrolytes in the untreated solution; another object is to utilize the available capacity of the demineralizing materials to the fullest extent possible; another object is to improve the economies of regeneration; a further object is to attain the aforesaid objects with a relatively small apparatus; and still another object is to provide an apparatus functioning with a minimum amount of attention on the part of the operator.

The manner in which these objects are achieved is illustrated in the appended drawings in which:

Fig. 1 is a diagrammatic view, partly in section, of an apparatus according to this invention and adapted to carry out the process of this invention;

Fig. 2 is a modification of certain portions of the apparatus of Fig. 1;

Fig. 3 is another modification of certain portions of the apparatus of Fig. 1.

Like numerals refer to like parts throughout the several views.

Figure 4:
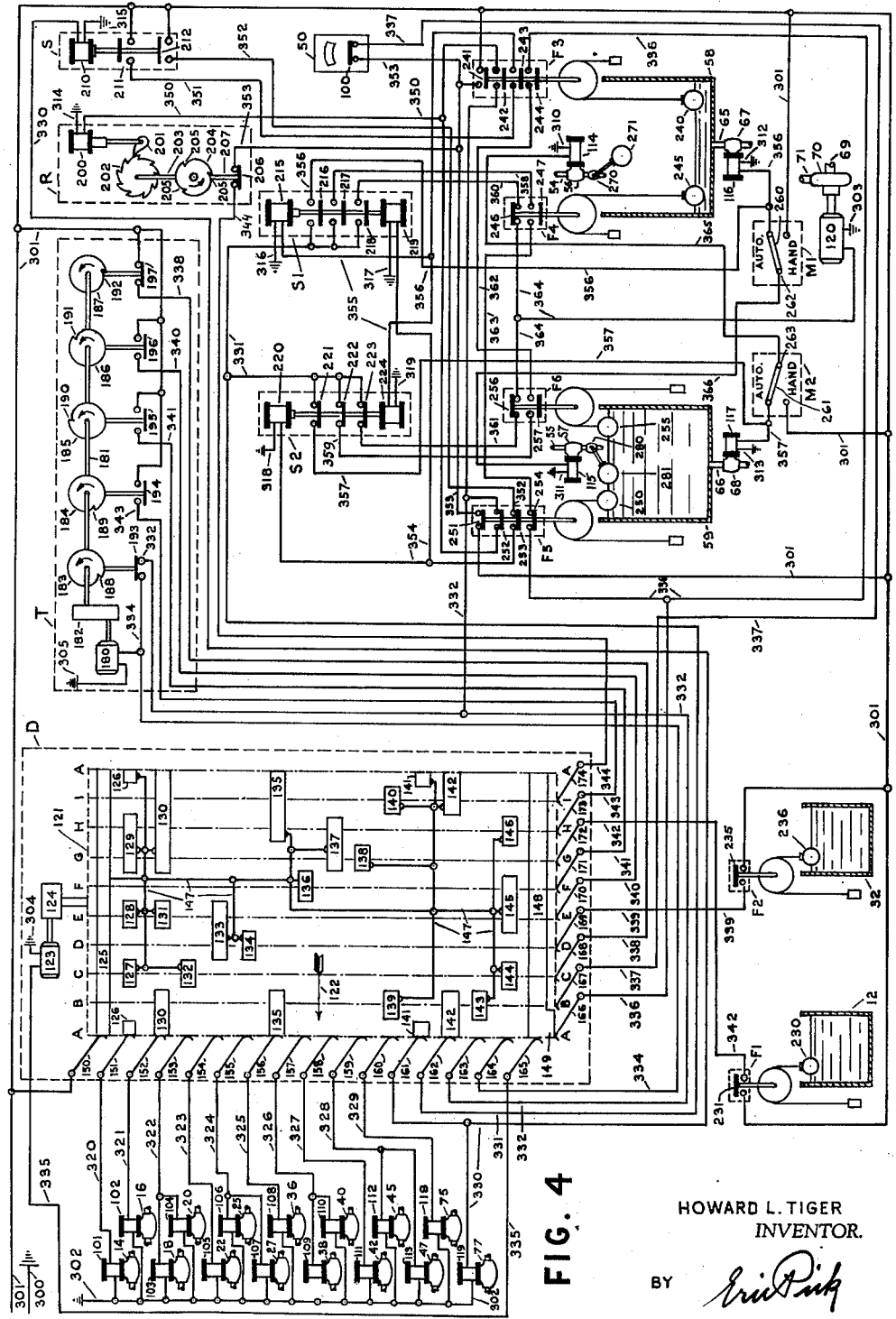
Fig. 4 is a wiring diagram for the apparatus of Fig. 1 to provide automatic operation thereof.

Referring now to Fig. 1, a cation exchange unit comprises a tank 10 containing a bed 11 of granular organic cation exchange material. Associated with tank 10 is a tank 12 containing regenerating solution, e. g. dilute sulfuric acid. A supply pipe 13 for solution to be treated is fitted with a valve 14 and communicates with a pipe 15 leading to the top of tank 10 and fitted with a valve 16. A backwash outlet 17 provided with a valve 18 is connected to pipe 15. A pipe 19 with valve 20 leads from pipe 13 to the bottom of tank 10 and also communicates with a rinse outlet 21 provided with a valve 22. An injector 23 communicates with supply pipe 13 through pipe 24 with valve 25 and also has a suction pipe 26 leading into tank 12 and fitted with a valve 27, and a discharge 28 leading into tank 10 above the top of bed 11.

An acid removal unit comprises a tank 30, containing a bed 31 of granular acid removal material which may be organic anion exchange material such as synthetic resin or inert material impregnated with synthetic resin adapted to remove free mineral acid from solution. A tank 32 containing a dilute solution of an alkali such as caustic soda, soda ash, sodium bicarbonate, ammonium hydroxide or the like, is associated with tank 30. A supply pipe 33 connected to pipe 19 communicates with a pipe 35 leading through a valve 36 to the top of tank 30. A pipe 34 leads from supply pipe 13 through a valve 40 to a pipe 39 connected with the bottom of tank 30. A backwash outlet pipe 37 with valve 38 communicates with pipe 35, and a rinse outlet 41 with valve 42 communicates with pipe 39. An injector 43 has a supply pipe 44 fitted with a valve 45 and communicating with supply pipe 33, a suction connection 46 leading into tank 32 and fitted with valve 47, and a discharge 48 leading into tank 30 above the top of bed 31.

A meter 50 for determining the electric conductivity of a solution is connected by means of a pipe 51 with the pipe 39 so as to receive a sample therefrom. The tested solution is discharged through a pipe 52 to a suitable point of disposal. It may, of course, be returned to pipe 39.

The pipe 39 has two discharge connections 54 and 55 fitted with valves 56 and 57, respectively, and each arranged to discharge into one of two receiving tanks 58 and 59, as shown. The receiving tanks 58 and 59 have outlet pipes 65 and 66 fitted with valves 67 and 68, respectively. Pipes 65 and 66 are connected with a suction pipe 69 of a pump 70. The pump 70 has a discharge pipe 71 fitted with a check valve 72 and connected to a return pipe 74 leading through a valve 75 to the supply pipe 13, and to a pipe 76 leading through a valve 77 to an elevated storage tank 78 which has an outlet 79 leading to a point of use. In the upper portion of storage tank 78 a degasifier is provided, comprising a head 80 carrying a plurality of nipples 81, and spaced horizontal slats 82 arranged in superimposed tiers. An air blower 83 is connected by means of a duct 84 with the air space below the slats 82.

The operation of the apparatus shown in Fig. 1 will now be described. Let it be assumed that the solution to be treated is raw water of high electrolyte content supplied to pipe 13. In placing the apparatus in operation, valves 14, 16, 36 and 56 are opened, all other valves being closed. Water now flows via pipes 13 and 15 to the top of tank 10, down through the cation exchange material 11, thence via pipes 19, 33 and 35 to the top of tank 30, down through the acid removal material 31, and finally through pipes 39 and 54 into the receiving tank 58. When a quantity of water has thus been collected in tank 58 the flow of water is stopped by closing valves 14 and 56. The pump 70 is started, and valves 57, 67 and 75 are opened, all other valves remaining as before. The water is now pumped from tank 58 via pipes 65, 69, 71 and 74 into the supply pipe 13, passing through the cation exchange and acid removal units a second time, and discharging through pipe 55 into the receiving tank 59. When the entire batch of water has thus been transferred from tank 58 to tank 59, valves 57 and 67 are closed and valves 56 and 68 are opened. Thereupon the water is pumped from tank 59, passing successively through the cation exchange and acid removal units a third time, and discharging into tank 58. This re-passing is repeated by alternately opening either valves 57 and 67 or 56 and 68, and closing the other pair of said valves, until the meter 50 shows that the water flowing through pipe 39 and sampled through pipe 51 has an electric conductivity corresponding to an electrolyte content low enough for the intended use.

Assuming that when this happens the batch of water is in tank 58, then valves 14, 16, 36, 57, 67 and 77 are opened, all other valves being closed. (If the batch of water should happen to be in tank 59, valves 56 and 68 would have to be opened instead of valves 57 and 67.) Now the treated water from tank 58 is pumped via pipes 65, 69, 71 and 76 to the top of the elevated storage tank 78. It is distributed by the nipples 81 and cascades over the slats 82, encountering a counter flow of air discharged by the blower 83 through duct 84 and escaping through the nipples 81. Dissolved $CO_2$ is thus effectively removed from the water which may then be withdrawn from the tank 78 via pipe 79 as needed. Simultaneously with the withdrawal of treated water from tank 58, a new batch of raw water admitted from pipe 13 is passed successively through the cation exchange and acid removal units and collected in the receiving tank 59.

When all treated water has been removed from tank 58, valves 67 and 77 are closed. When, furthermore, another batch of water of sufficient volume has been collected in tank 59, valves 14 and 57 are closed, and valves 56, 58 and 75 are opened, so that the new batch is pumped from tank 59 through the cation exchange and acid removal units into tank 58. This re-passing is repeated by manipulating valves 56, 57, 67 and 68, as described above. Having made the batches relatively large, it will be found by observing the reading of meter 50, that after 2 or 3 passes the electrolyte content of the water flowing through pipe 39 has not reached a sufficiently low value and does not drop appreciably even upon repeated re-passing. This indicates that the cation exchange and acid removal materials have been exhausted and require regeneration.

Preparatory to regeneration all valves of the apparatus are closed and the pump 70 is stopped, the partly treated batch of water undergoing treatment being retained in either one of the two receiving tanks 58 and 59. In the following description of the cycle of regenerating operations only the valves to be opened in each of the individual steps will be referred to, it being understood that all valves not specifically mentioned in any particular step of the regenerating cycle are closed.

First, the cation exchange unit is backwashed by opening valves 14, 18 and 20. Raw water from pipe 13 flows through pipe 19 into tank 10, upwardly through the material 11, and to waste via pipes 15 and 17. This is continued for about 10 minutes, until the wash water discharged by pipe 17 is clear.

Second, the cation exchange unit is regenerated by opening valves 22, 25 and 27. Raw water from pipe 13 flows through pipe 24 to the injector 23, drawing acid regenerant from tank 12 through pipe 26, and the diluted regenerant passes through pipe 28 to the upper portion of tank 10, downward through the material 11, and to waste, via pipes 19 and 21. This is continued until a sufficient quantity of regenerant has been injected.

Third, the cation exchange unit is rinsed by opening valves 14, 16 and 22. Raw water flows from pipe 13 through pipe 15 to the top of tank 10, downward through the material 11, and to waste via pipes 19 and 21. This is continued until the unit has been rinsed sufficiently free of spent and excess regenerant.

Fourth, the acid removal unit is backwashed by opening valves 38 and 40. Raw water flows from pipe 13 via pipes 34 and 39 into tank 30, up through the material 31, and to waste through pipes 35 and 37. This is continued for a few minutes, until the wash water discharged by pipe 37 is clear.

Fifth, the acid removal material is regenerated by opening valves 14, 16, 42, 45 and 47. Raw water from pipe 13 flows through pipe 15, the cation exchange material 11, pipes 19, 33 and 44 to the injector 43, drawing alkali solution from tank 32 through pipe 46, and the diluted regenerant passes through pipe 48 to the upper portion of tank 30, downward through the material 31, and via pipes 39 and 41 to waste. This is continued until a sufficient quantity of regenerant has been injected.

Sixth, the acid removal material is rinsed by opening valves 14, 16, 36 and 42. Raw water from pipe 13 now flows through pipe 15, the cation exchange material 11, pipes 19, 33 and 35 to the top of tank 30, down through the acid removal material 31, and via pipes 39 and 41 to waste. This is continued until the water flowing through pipe 39 has an electrolyte content approximately equal to that of the raw water. Such water, while not suitable for use, may be mixed with the stored, partly treated batch of water since the mixture will be subjected to further treatment, as will presently be described.

The six steps of the regeneration process are carried out successively in the order named, except that the third step (rinsing the cation exchange material) and the fourth step (backwashing the acid removal material) may be carried out concurrently, if so desired.

Regeneration of both units being completed, the further treatment of the stored, partly treated batch of water is resumed. To this end pump 70 is started, and valves 16, 36 and 75 as well as either valves 56 and 68 or 57 and 67 (depending upon whether the partly treated batch of water had been stored in tank 59 or 58, respectively) are opened, all other valves being closed. Re-passing of the batch of water through the two units is continued by appropriate manipulation of valves 56, 57, 67 and 68 until the meter 50 indicates that the desired low electrolyte content has been reached.

Thereupon, as previously described, the treated batch of water is passed from the one receiving tank to the storage tank while simultaneously another new batch of water is admitted from pipe 13 through the two treatment units to the other receiving tank. The batch is then further treated by repeated re-passing through the two treatment units until they are exhausted whereupon they are regenerated. Then the new batch is again passed through the units until the treatment is completed. Thus the cycle of operations is repeated, each regenerating cycle being interspersed in successive passes of one batch of water.

Fig. 2 shows a modification of certain portions of the apparatus of Fig. 1. Here the receiving tank 58 is connected with a point of use (through a pump, degasifier and elevated storage tank, if desired) by a pipe 88 fitted with a valve 89. The pump 70 is connected to draw from the receiving tank 59 through a pipe 85, and to discharge into the supply pipe 13 through a return pipe 86. Within tank 59, and underneath the discharge pipe 55 is a baffle or overflow trough 87 to prevent, as much as possible, mixing of the entering liquid with liquid contained in tank 59.

In the operation of the modification shown in Fig. 2 only those steps will be described which are different from those set forth above in connection with Fig. 1. When starting operation, valves 14 and 57 are opened until a predetermined batch of water has been collected in tank 59. Then valve 14 is closed and pump 70 is started, causing the water in tank 59 to be pumped via pipes 85 and 86 through the cation exchange and acid removal units and through pipe 55 back into tank 59. Thus, the batch of water may be passed repeatedly through the two units as often as desired without changing any valve settings. When the cation exchange and acid removal units are exhausted this re-passing is interrupted by closing valve 57 and stopping pump 70, to be resumed after regeneration of the two units has been completed. As soon as the electrolyte content of the batch undergoing treatment has reached the desired low valve, valve 57 is closed and valve 56 opened so that the treated water is discharged into the tank 58. When the entire batch of water has thus been transferred from tank 59 to tank 58, the pump 70 is stopped, valve 56 is closed and valves 14 and 57 are opened, admitting a new batch of water to tank 59 and thus starting a new cycle of operations. While this new batch is being treated, the previously treated water may be withdrawn from tank 58 via pipe 88 as needed.

In the modification shown in Fig. 3 a single receiving tank 90 is used. The pipe 39 is arranged to discharge selectively into this tank through a pipe 91 under control of a valve 92, or to a point of use through a pipe 95 fitted with a valve 96. The pump 70 has a suction pipe 93 connected with tank 90 and a discharge pipe 94 connected with the supply pipe 13. A baffle or overflow trough 97 is placed underneath the discharge pipe 91 for the purpose noted in connection with Fig. 2. If a continuous and uninterrupted supply to service is required, a storage tank must be provided in the service pipe 95, an additional provision of a degasifier and service pump being optional.

In operation of the apparatus shown in Fig. 3, valves 14 and 92 are opened to admit water via the treating units to tank 90. As soon as a predetermined batch has been collected in tank 90, valve 14 is closed and the pump 70 started. Then this batch of water is passed from tank 90 via pipes 93 and 94 to the treatment units and thence through pipes 39 and 91 back into tank 90 as long as necessary to obtain the desired quality of treated water, this operation being interrupted by closing valve 92 and stopping pump 70 when the treatment materials have been exhausted and require regeneration. When treatment of a batch has been completed valve 82 is closed and valve 96 opened so that the batch of water is pumped through the treatment units and via pipe 95 to service. As soon as tank 90 has thus been emptied, this cycle of operations is repeated.

It will be noted that in the arrangements of Figs. 2 and 3 the solution may be passed through the treatment units as many times as desired without requiring any attention whatsoever, whereas in the arrangement of Fig. 1 the valves 56, 57, 67 and 68 must be manipulated every time the batch of solution has been passed through the treatment units. This apparent advantage in favor of the arrangement of Figs. 2 and 3 is offset, however, by the disadvantage that a larger number of passes is required than with the arrangement of Fig. 1 to produce treated solution meeting given specifications, because in spite of the provision of the baffles or overflow troughs 87 and 97, respectively, some intermingling of newly admitted and previously treated solution takes place in tanks 59 and 90, respectively, so that certain portions of each batch are passed through the units more often than others. Such intermingling cannot take place in the arrangement of Fig. 1 wherein the solution, in each passing, is taken from one receiving tank and discharged into the other. It follows, therefore, that an apparatus of given size, while requiring somewhat less attention, will require a longer time to treat a given volume of solution, or in other words, will produce a lesser quantity of treated solution in a given time, when the solution receiving means of Figs. 2 or 3 are used rather than the receiving means shown in Fig. 1. Thus, each of the three modifications shown has certain advantages and disadvantages as compared with either of the others, and choice of the type of arrangement to be used in any particular case will best be governed by a consideration of local conditions.

While not necessary for the practice of this invention, it is highly desirable for convenient and efficient operation that both the cation exchange unit and the acid removal unit are matched as to capacity so as to become exhausted and ready for regeneration at the same time. The cation exchange unit removes metallic cations, whereas the acid removal unit removes chlorides and sulfates, as a rule a lesser quantity in equivalent terms. Therefore, the ratio of the quantity of cation exchange material to the quantity of acid removal material is best determined in each case so as to match approximately the ratio of total metallic cations to the sum of chlorides and sulfates in the solution to be treated. If, in the course of operation, the ratio of metallic cations to chlorides plus sulfates in the solution being treated should decrease or increase somewhat, then the quantity of regenerant used in regenerating the cation exchange material or acid removal material, respectively, may be reduced. In this manner the operator is able to change the ratio of cation exchange capacity to acid removal capacity of a given installation to match, within certain limits, a change in the ratio of metallic cations to the sum of chlorides plus sulfates in the solution undergoing the treatment.

In practicing this invention it is preferable to make the volume of each batch of solution such that it contains a quantity of electrolytes equal to the electrolyte removal capacity, between regenerations, of the cation exchange and acid removal materials, or one-half, one-third, etc., of such capacity, in other words, a simple fraction in which the numerator is unity. This has the advantage that the times at which the treatment materials become exhausted and ready for regeneration remain in step with the times at which treatment of one batch is completed and that of another batch started. Such coordination of regenerations and batch replacements renders operation of the apparatus more orderly and convenient, and makes for maximum economy in the use of regenerants. The coordination may be effected by providing either one of the following programs: Staggering the regenerations and batch replacements; i. e. arranging regeneration to take place between successive passes of a batch, as set forth in the foregoing description, or synchronizing the regenerations and batch replacements, i. e. arranging regeneration to take place at a time when treatment of a batch has been completed and before treatment of the next batch is started.

The process of this invention may appropriately be referred to as multiple demineralizing in view of the characterizing feature that each batch of solution is passed repeatedly through the treatment units. This term applies regardless of whether or not regenerations and batch replacements are coordinated, and whether a program of staggered or synchronized regenerations and batch replacements is followed.

In order to obtain a clear picture of the merits of multiple demineralizing according to this invention over the prior art processes the tests presently to be described were carried out. These tests were made under laboratory conditions because they permit more accurate control of all variables than is possible in a full size plant. The electrolyte solution treated was raw water, the analysis of which is as follows, expressed in P. P. M. as $CaCO_3$:

| Cations | Parts per million | Anions | Parts per million |
|---|---|---|---|
| Calcium | 102 | Bicarbonates | 110 |
| Magnesium | 312 | Chlorides | 2,457 |
| Sodium | 2,368 | Sulfates | 215 |
| Total | 2,782 | Total | 2,782 |

The beds of treatment material were matched to this water analysis so as to become exhausted and ready for regeneration at about the same time. The bed of cation exchange material had a diameter of 3.5 cm. and consisted of 400 ml. of granular organic hydrogen cation exchanger (sulfonated coal); the regenerant was 1200 ml. of 0.403 N $H_2SO_4$. The bed of acid removal material had a diameter of 2.3 cm. and consisted of 200 ml. of granular synthetic resin acid remover; the regenerant used for this bed was 280 ml. of 0.75 N $Na_2CO_3$ solution. In all the tests the beds were backwashed and rinsed in a uniform manner, and one-half hour was taken to introduce the quantities of regenerant noted above. In treating the water the rate of flow was 100 ml. per minute. The electrolyte content of the treated water was determined by means of an electric conductivity meter, and the results are given in terms of P. P. M. NaCl. The following six methods of demineralizing were tested under the conditions set forth above:

First, the well known method of demineralizing by a single passage of the water through cation exchange and acid removal material. The treated water was collected in portions of 500 ml. each, and it was found that the first portion contained about 50 P. P. M. of electrolytes (expressed as NaCl), the second portion 24, the third portion about 60, and the fourth and last portion about 300. In other words, with a raw water of as high an electrolyte content as that used in these tests, single pass operation furnishes treated water of a quality not meeting stringent specifications.

Second, recycling to the cation exchange unit three-fourths of the water discharged by the acid removal unit, in accordance with the method suggested in Riley Patent 2,267,841. The treated water was collected in successive portions of 100 ml. each. About 800 ml. of the treated water was found to have an electrolyte content of 10 P. P. M. or less, the average of the 800 ml. being 6.6 P. P. M. and the lowest value obtained in any of the 100 ml. portions being 4.5 P. P. M.

Third, the method outlined in the foregoing paragraph, except that five-sixths of the water discharged by the acid removal unit was recycled. About 900 ml. of the treated water had an electrolyte content of 10 P. P. M. or less, the average of the 900 ml. being 4.0 P. P. M., and the lowest value obtained in any of the 100 ml. portions being 2.9 P. P. M.

Fourth, multiple demineralizing in accordance with this invention by passing a batch of 2000 ml. three times through the treatment units, regeneration and batch replacement being synchronized. The treated water was found to have an electrolyte content of 3.0 P. P. M.

Fifth, multiple demineralizing in accordance with this invention by passing a batch of 3000 ml. four times through the treatment units, regeneration and batch replacement being staggered (regeneration after three passes). The treated water had an electrolyte content of 4.3 P. P. M.

Sixth, the method outlined in the foregoing paragraph, except that the batch was passed through the treatment units six times. The treated water had an electrolyte content of less than 1 P. P. M.

For a clear comparison of these test results, which in every case are typical of a number of consecutive cycles of operations, the significant data are summarized in the following tabulation.

| Test No. | Method of demineralizing used in test | Quantity of treated water with electrolyte content not exceeding 10 p.p.m. | Electrolyte content of treated water | |
|---|---|---|---|---|
| | | | Average of stated quantity | Lowest obtained |
| | | Ml. | P. P. M. | P. P. M. |
| 1 | Single pass | 0 | | 24 |
| 2 | Recycling three-fourths (Riley Patent 2,267,841) | 800 | 6.6 | 4.5 |
| 3 | Recycling five-sixths (Riley Patent 2,267,841) | 900 | 4.0 | 2.9 |
| 4 | Multiple demineralizing, synchronized regeneration, 3 passes | 2,000 | 3.0 | 3.0 |
| 5 | Multiple demineralizing, staggered regeneration, 4 passes | 3,000 | 4.3 | 4.3 |
| 6 | Multiple demineralizing, staggered regeneration, 6 passes | 3,000 | <1.0 | <1.0 |

The results show that by multiple demineralizing in accordance with this invention (tests 4 to 6), as compared with demineralizing methods heretofore known (tests 1 to 3), spectacular increases in the quantity of treated water are obtained, and that the quality of the treated water is improved. This is all the more remarkable as the same quantities of regenerants were used in all the tests.

When cation exchange and acid removal materials of the type used in these tests are employed in single pass demineralization of ordinarily encountered raw water with an electrolyte content up to a few hundred P. P. M. (i. e. not nearly as high as the 2782 P. P. M. used in the tests), and where the requirements as to quality are not exceptionally stringent, these materials have capacities, between regenerations, of about 275 and 600 m. eq. per l., respectively. Such normal capacities are not obtainable when demineralizing high electrolyte waters in accordance with previously known methods (tests 1 to 3). By multiple demineralizing of high electrolyte water in accordance with this invention, using synchronized regeneration (test 4), a cation exchange capacity of about 290 m. eq. per l. and an acid removal capacity of about 570 m. eq. per l. were obtained. Thus, by my improved method, using synchronized regeneration, it is possible to obtain, under abnormally severe operating conditions, capacities which are approximately equal to capacities obtained by earlier methods under normal conditions. With the use of staggered regeneration (tests 5 and 6), however, the cation exchange capacity was as high as about 425 m. eq. per l. and the acid removal capacity about 850 m. eq. per l. In other words, by multiple demineralizing in accordance with my invention, using staggered regeneration, cation exchange and acid removal capacities are obtained under abnormally severe conditions which exceed by as much as 55 and 40 per cent, respectively, normal capacities obtained by the use of formerly known methods under normal conditions. The reason for this startling improvement in capacity may be understood by considering the properties of ion exchange materials. Directly after regeneration, and upon rinsing out all spent and excess regenerant from the material, ions are exchanged or removed from the solution undergoing treatment quite thoroughly. In other words, the metallic cation content in the case of cation exchange, or the content of anions of acids (except carbonic acid) in the case of acid removal, in the treated solution is quite low, approaching zero when the concentration of such ions in the raw solution is not very high. As the treatment progresses this thorough exchange or removal continues quite uniformly for some time. However, as the limit of capacity of the ion exchange material is approached, the ion exchange becomes less and less complete. That is to say, the concentration, in the treated solution, of ions which are to be removed in the process, rises gradually, slowly at first and then increasingly faster. When, in the ordinary use, the concentration of the treated solution has thus risen to the limit permissible in any particular case, the treating operation is terminated and the ion exchange material is regenerated. This means, of course, that a substantial portion of the ultimate exchange capacity remains unused and is wasted. It is this normally unused portion of the capacity which is utilized by the program of staggered regeneration in accordance with this invention. In this method a batch of raw solution is passed through partly exhausted material until the ion exchange practically ceases. The fact that the ion exchange is incomplete does not matter for, subsequent to regeneration, the same batch of solution will be passed through freshly regenerated material which thus will have had restored to it the full ability to remove ions, and which, therefore, will complete treatment of the batch regardless of how much or how little of the ions had been removed from the solution prior to regeneration. The amount of capacity obtainable after substantially complete exchange ceases varies for different exchangers. With most materials it amounts to as much as about 50 per cent of the normally usable capacity, thus accounting for a corresponding increase in capacity obtained in the tests with staggered regeneration over that obtained with synchronized regeneration.

One drawback of my method of multiple demineralizing, especially with staggered regeneration, is the relatively large number of valve manipulations required at various times during each cycle of operations, necessitating more or less continuous attention on the part of an operator. This objection may be overcome by automatic control of the various valves.

Fig. 4 shows electrical operating and control equipment for providing automatic operation of the apparatus of Fig. 1. Only those devices of Fig. 1 are included in this diagram which are necessary for an understanding of the automatic operation. In this arrangement the sequence and timing of the various steps of each cycle are controlled by a motor driven drum switch mechanism D, a motor driven cam type time switch mechanism T, a ratchet relay R, a solenoid switch S, a pair of mechanically latched-in solenoid switches S1 and S2 with electrically operated release, float switches F1 and F2 mounted on regenerating solution tanks 12 and 32, respectively, float switches F3 and F4 mounted on receiving tank 58, float switches F5 and F6 mounted on receiving tank 59, manually operated switches M1 and M2, and a switch 100 operated by the meter 50 to close when the conductivity of the sample being tested does not exceed a predetermined low value, and to open when the conductivity exceeds said value.

The valves 14, 16, 18, 20, 22, 25, 27, 36, 38, 40, 42, 45, 47, 56, 57, 67, 68, 75 and 77 are operated by solenoids 101, 102, 103, 104, 105, 106, 107, 108, 109, 110, 111, 112, 113, 114, 115, 116, 117, 118 and 119, respectively. The valves are of the normally closed type, that is to say they are opened by energization of the solenoids, and they close when the solenoids are deenergized. The pump 70 is driven by an electric motor 120.

The drum switch mechanism D has a drum 121 made of insulating material (shown in developed form) and adapted to be rotated in the direction of the arrow 122 by a motor 123 through a speed reducer 124. On drum 121 are mounted contact strips 125 to 146 inclusive, all electrically interconnected by the branched wire 147, and also a contact strip 148 with a lateral extension 149. The switch mechanism D also has brushes 150 to 165 adapted to variously make contact with strips 125 to 146 and 148 in nine different operating positions of the drum 121, and brushes 166 to 174 which, upon rotation of the drum 121, are successively contacted by the lateral extension 149.

The time switch mechanism T comprises a constant speed motor 180 which is adapted to rotate a shaft 181 through a speed reducer 182. The shaft 181 carries cams 183, 184, 185, 186 and 187 having notches 188, 189, 190, 191 and 192, respectively. Switches 193 to 197 are controlled by the cams 183 to 187, switch 193 being opened when its stem drops into notch 188, whereas switches 194, 195, 196 and 197 are closed when their stems drop into the respective notches 189, 190, 191 and 192.

The ratchet relay R has a solenoid 200 adopted, upon each energization thereof, to move a pawl 201 an amount sufficient to advance a ratchet wheel 202 one tooth. The ratchet wheel 202 has nine teeth and is mounted on a shaft 203 which also carries a cam 204 having three notches 205. A switch 206 controlled by the cam 204 is normally open and closes when the stem 207 drops into any one of the notches 205. Thus, switch 206 is closed by each third successive energization of the solenoid 200, and maintained open by the intermediate two energizations of the solenoid.

The solenoid switch S has a coil 210 which, upon energization, opens normally closed switches 211 and 212.

The solenoid switch S1 has an operating coil 215 which, upon energization, closes switches 216, 217 and 218. When coil 215 is subsequently deenergized the switches 216, 217 and 218 remain closed because of the function of a mechanical latch-in mechanism (not illustrated), to be opened only when release coil 219 is energized. Solenoid switch S2 is of similar construction as switch S1, comprising an operating coil 220, switches 221, 222 and 223, and a release coil 224.

Float switch F1 has a float 230 actuating a switch 231 in such manner that the switch is open when tank 12 is full, and closes when the float 230 has dropped to a predetermined level, in other words, after a predetermined quantity of regenerant has been withdrawn from tank 12. Float switch F2 is of similar construction, having a switch 235 actuated by a float 236 which rides on the regenerating solution in tank 32 and closes switch 235 when a predetermined quantity of solution has been withdrawn.

Float switch F3 has a float 240 which closes switches 241, 242, 243 and 244 when the liquid in tank 58 has reached a predetermined high level, and, which opens these switches when the level of solution has dropped a relatively small amount, say one or two inches below said high level. Float switch F4 has a float 245 actuating switches 246 and 247 in such manner that switch 246 is opened and switch 247 is closed when tank 58 is practically empty (containing just enough liquid to prevent the float 245 from touching bottom), but that switch 246 is closed and switch 247 opened when the level in tank 58 rises a small amount.

Float switch F5 is similar to switch F3, having a float 250 which closes switches 251, 252, 253 and 254 when tank 59 contains a predetermined volume of liquid and which opens these switches when the tank contains less liquid. Float swtch F6 is similar to switch F4; it has a float 255 which opens switch 256 and closes switch 257 when tank 59 is nearly empty, and reverses the position of both switches as soon as the level of liquid has risen a small amount.

Manual switches M1 and M2 have switch members 260 and 261 adapted to be placed so as to connect the respective terminals 262 and 263 selectively with the terminals marked "Hand" and "Auto."

Pipe 54 is fitted with a valve 270 so actuated by a float 271 riding on the liquid in tank 58 as to close when the level rises by a small margin beyond the level at which float 240 closes the switches 241 to 244. Pipe 55 is similarly fitted with a valve 280 which is closed by a float 281 when the liquid in tank 59 rises beyond the level at which float 250 closes switches 251 to 254.

Electric power is supplied from a source (not shown) through wire 300 which is grounded, and wire 301 which has branches connected with brush 150, the right hand contact points of switches 194, 195, 196, 197, 211, 212, 235 and 241, the "Hand" terminals of switches M1 and M2, and the left hand contact points of switches 231 and 251.

Solenoids 101 to 113, 118 and 119 are grounded through the branched wire 302. Motors 120, 123 and 180 are grounded at 303, 304 and 305, respectively. Solenoid coils 114, 115, 116, 117, 200, 210, 215, 219, 220 and 224 are grounded through wires 310, 311, 312, 313, 314, 315, 316, 317, 318 and 319, respectively. All these motors and solenoids are thus electrically connected with wire 300.

The brushes 151 to 174 have connections as follows: brush 151 by wire 320 with solenoid 101; brush 152 by wire 321 with solneoid 102; brush 153 by branched wire 322 with solenoids 103 and 104; brush 154 by wire 323 with solenoid 105; brush 155 by branched wire 324 with solenoids 106 and 107; brush 156 by wire 325 with solenoids 108; brush 157 by branched wire 326 with solenoids 109 and 110; brush 158 by wire 327 with solenoid 111; brush 159 by branched wire 328 with solenoids 112 and 113; brush 160 by wire 329 with solenoid 118; brush 161 by branched wire 330 with solenoids 119 and 210; brush 162 by branched wire 331 with the left hand points of switches 216 to 218 and the right hand points of switches 221 to 223; brush 163 by branched wire 332 with the right hand points of switches 193 and 252 and the left hand point of switch 242; brush 164 by branched wire 334 with motor 180 and the left hand point of switch 193; brush 165 by wire 335 with motor 123; brush 166 by branched wire 336 with the left hand point of switch 254 and the right hand point of switch 244; brush 167 by wire 337 with the right hand point of switch 100; brush 168 by wire 338 with the left hand point of switch 197; brush 169 by wire 339 with the left hand point of switch 235; brush 170 by wire 340 with the left hand point of switch 196; brush 171 by wire 341 with the left hand point of switch 195; brush 172 by wire 342 with the right hand point of switch 231; brush 173 by wire 343 with the left hand point of switch 194; and brush 174 by wire 344 with the left hand point of switch 206.

The apparatus, furthermore, includes the following connections: branched wire 350 connecting solenoid 200 with the right hand point of switch 242 and the left hand point of switch 252; wire 351 interconnecting the left hand points of switches 211 and 243; wire 352 interconnecting the left hand point of switch 212 and the right hand point of switch 253; branched wire 353 interconnecting the left hand points of switches 100 and 241 with the right hand points of switches 206 and 251; branched wire 354 connecting the left hand point of switch 353 with solenoids 219 and 220; branched wire 355 connecting the right hand point of switch 243 with solenoids 215 and 224; branched wire 356 connecting the right hand point of switch 216 with solenoid 116 and the "Auto." terminal of switch M1; branched wire 357 connecting the left hand point of switch 221 with the solenoid 117 and the "Auto." terminal of switch M2; wire 358 interconnecting the right hand points of switches 217 and 247; wire 359 interconnecting the left hand points of switches 222 and 257; wire 360 interconnecting the right hand points of switches 218 and 246; wire 361 interconnecting the left hand points of switches 223 and 256; wire 362 connecting the left hand point of switch 244 with the right hand point of switch 257; wire 363 connecting the left hand point of switch 247 with the right hand point of switch 254; branched wire 364 connecting the motor 120 with the left hand point of switch 246 and the right hand point of switch 256; wire 365 interconnecting solenoid 114 and terminal 263 of switch M2; and wire 366 interconnecting solenoid 115 and terminal 262 of switch M1.

In the following description of the operation of the apparatus of Figs. 1 and 4 the various flow paths of the solution will be referred to but briefly, having been traced in detail in describing manual operation of the apparatus shown in Fig. 1.

It will be noted that brush 150 is permanently in contact with strip 125 as the drum 121 rotates so that strips 126 to 146 are at all times in electrical connection with supply wire 301 through brush 150, strip 125 and branched wire 147. For the sake of brevity the various electrical circuits will, therefore, be described only starting with any of the strips 126 to 146, it being understood that the circuits extend to these strips from supply wire 301 via brush 150, strip 125 and branched wire 147. In a like manner, the circuits will be described up to any of the ground connections 302 to 305 and 310 to 319 only, it being understood that the circuits continue from these connections to the supply wire 300. In actual practice, as a matter of fact, it will usually be found preferable to extend branches of the supply wire 300 directly to the connections 302 to 305 and 310 to 319.

In Fig. 4 the control devices are shown in the positions which they occupy when treatment of one batch of solution has just been completed, the batch being contained in receiving tank 59. A circuit is established from strip 126 through brush 151, wire 320 and solenoid 101 to ground connection 302, opening valve 14. A second circuit from strip 130 through brush 152, wire 321 and solenoid 102 to ground 302 opens valve 16. A third circuit from strip 135 through brush 156, wire 325 and solenoid 108 to ground 302 opens valve 36. A fourth circuit starting at strip 141 goes via brush 161 and branched wire 330 on the one hand through solenoid 119 to ground 302, opening valve 77, and, on the other hand through solenoid 210 to ground 315, opening switches 211 and 212. A fifth circuit starts at strip 142 and goes through brush 162 and branched wire 331 to switches 221 and 223; from switch 221 the circuit continues through wire 357, branching through solenoid 117 to ground 313, and through switch member 261, terminal 263, wire 365 and solenoid 114 to ground 310, thus opening valves 68 and 56; from switch 223 the circuit continues through wire 361, switch 256, wire 364 and motor 120 to ground 303, so that pump 70 runs.

With valves 14, 16, 36, 56, 68 and 77 open, and pump 70 running, the treated solution is pumped from tank 59 to the storage tank 78 (Fig. 1), while at the same time a new batch of solution is being admitted to tank 58. The new solution flowing through pipe 39 will have an electric conductivity higher than that at which meter 50 maintains switch 100 in closed position. Switch 100 will, therefore, be opened. As soon as some solution has been withdrawn from tank 59 float switch F5 will open. Neither of these switch changes, however, will have any effect on the established circuits, and both the above stated flows of solution continue until the treated batch has been withdrawn from tank 59 and a full new batch has been admitted to tank 58. Both these events will never occur at exactly the same time, and, depending on which occurs first, the sequence of operations will be somewhat different. It is desirable, however, that the rate of flow at which the new batch is introduced be somewhat greater than the rate at which the treated batch is being withdrawn. This is accomplished by providing valve 77 with a port opening smaller than that of the other valves. The same result could also be obtained by limiting the movement of valve 77 so that it cannot open wide, or by installing an orifice or other flow limiting device in pipe 76. When the level in tank 58 has risen to a predetermined height float 240 closes the switches 241 to 244. This still does not alter the established circuits in any way. After a small additional rise in level the float 271 closes valve 270 (which is preferably of the quick closing type), thus terminating the flow into tank 58 which now contains an accurately measured new batch of solution. A short time thereafter the treated solution will have been withdrawn from tank 59 to the extent that float 255 opens switch 256 and closes switch 257. The opening of switch 256 breaks the circuit through motor 120, stopping pump 70, while the closing of switch 257 establishes a circuit from strip 142 through brush 162, wire 331, switch 222, wire 359, switch 257, wire 362, switch 244, wire 336, brush 166, strip 148, brush 165, wire 335, and motor 123 to ground 304.

Motor 123 runs and rotates drum 121 in the direction of the arrow 122 until brushes 150 to 165 contact the drum 121 along line B—B at which time the motor 123 stops because the extention 149 has moved out of contact with brush 166, coming to rest in contact with brush 174. In this new position of drum 121 brushes 151 and 161 have moved out of contact with strips 126 and 141, respectively, thus breaking the circuits through solenoids 101, 119 and 210 so that valves 14 and 77 and switches 211 and 212 close. The closing of switch 211 establishes a circuit from line 301 via switch 211, wire 351, switch 243 and branched wire 355, thence through solenoids 215 and 224 to the respective ground connections 316 and 319; the energization of operating solenoid 215 closes switches 216 to 218 while the energization of the release solenoid 224 opens switches 221 to 223. The opening of switch 221 deenergizes solenoids 114 and 117, closing valves 56 and 68. Brushes 152 and 156 remain in contact with strips 130 and 135, thus maintaining the previously described circuits through solenoids 102 and 108 so that valves 16 and 36 remain open. Brush 162 remains in contact with strip 142, and brushes 160 and 163 have moved into contact with strips 139 and 143, respectively. Thus a circuit is established from strip 139 through brush 160, wire 329 and solenoid 118 to the ground 302, opening valve 75. Another circuit runs from strip 142 through brush 162 and wire 331 to switches 216 and 218; from switch 216 the circuit continues via branched wire 356 through solenoid 116 to the ground 312, and through switch member 260, terminal 262, wire 366 and solenoid 115 to ground 311, opening valves 67 and 57; from switch 218 the circuit continues through wire 360, switch 246, wire 364 and motor 120 to ground 303, thus again starting pump 70. Still another circuit runs from strip 143 through brush 163 to wire 332 and then divides itself, one branch going through switch 193, wire 334 and motor 180 to ground 305, while the other branch continues through switch 242, wire 350 and solenoid 200 to ground 314. The motor 180 now rotates shaft 181 in the direction indicated by the arrows until the stem of switch 193 drops into notch 188 of cam 183 whereupon switch 193 opens, stopping motor 180. During the rotation of shaft 181 cam 187 has opened switch 197. Thus the stopping of motor 180 leaves the time switch mechanism T in its zero or starting position in which all its switches 193 to 197 are open. The energization of solenoid 200 pulls pawl 201 upwardly, advancing ratchet wheel 202 one tooth and turning cam 204 so that notch 205 moves away from the stem 207 of switch 206 which, therefore, opens.

Valves 16, 36, 57, 67 and 75 being open, the solution is now pumped from tank 58 into tank 59, passing through the treatment units a second time. As the level in tank 58 drops float 240 soon opens switches 241 to 244. The opening of switch 242 deenergizes solenoid 200 which permits pawl 201 to drop, to be thus ready for another actuation. The opening of switch 243 deenergizes solenoids 215 and 224, but switches 216 to 218 remain nevertheless in closed position because of the mechanical latch-in mechanism previously mentioned. When the batch of solution has been transferred to tank 59 float 250 closes float switch F5. At such time the level in tank 58 has not dropped sufficiently to change the positioning of float switch F4. This is so because after the previous closing of float switch F3 an additional small quantity of solution had been admitted up to the level at which float valve 270 closed, and this small quantity is now left in tank 58 in addition to another small quantity equal to that which had been left in tank 59 at the time float switch F6 had moved to terminate the withdrawal of the previously treated batch of solution to the storage tank 78. It is to be understood that float switches F3 and F5 are adjusted to be closed upon admission of approximately equal volumes of solution to the tanks 58 and 59, respectively, and that float switches F4 and F6 are likewise adjusted to stop further withdrawal of solution when about equal volumes have been withdrawn from the tanks. The closing of float switch F5 establishes a circuit from strip 143 through brush 163, wire 332, switch 252, wire 350, and coil 200 to the ground 314, advancing the ratchet wheel 202 a second tooth. It also establishes a circuit from wire 301 through switch 212, wire 352, switch 253 to wire 354, and thence in divided paths through solenoids 219 and 220 to the respective grounds 317 and 218. The energization of solenoids 219 and 220 opens switches 216 to 218 and closes switches 221 to 223. The opening of switch 216 deenergizes solenoids 115 and 116, closing valves 57 and 67, while the closing of switch 221 establishes a circuit from strip 142 through brush 162, wire 331 and switch 221 to wire 357, thence branching through solenoid 117 to ground 313 and through switch member 261, terminal 263, wire 365 and solenoid 114 to ground 310, opening valves 68 and 56. By the opening of switch 218 and the simultaneous closing of switch 223 the connection between wires 331 and 364 is simply transferred from switches 218 and 246 to switches 223 and 256 so that the motor 120 remains energized and pump 70 continues to operate.

Now valves 16, 36, 56, 68 and 75 are open and the batch of solution is pumped from tank 59 to tank 58, passing through the treatment units a third time. As the level in tank 59 drops float 250 opens switches 251 to 254, breaking the circuit through solenoids 200, 219 and 220. The pawl 201 drops, but switches 221 to 223 are retained in their closed position by the latch-in mechanism of switch S2. As soon as the batch of solution being treated has been transferred to tank 58 float 240 closes switches 241 to 244, the position of float switch F6 remaining unchanged for the reason previously given with regard to float switch F4. The closing of switch 243, as previously explained, energizes solenoids 215 and 224, opening switches 221 to 223 and closing switches 216 to 218 whereby solenoids 114 and 117 are deenergized and solenoids 115 and 116 energized, closing valves 56 and 68 and opening valves 57 and 67. Furthermore, the circuit for the motor 120 is transferred from switches 223 and 256 to switches 218 and 246. The closing of switch 242 energizes solenoid 200, as described previously, and the ratchet wheel 202 is advanced a third tooth so that the stem 207 of switch 206 drops into one of the notches 205, closing the switch. This establishes a circuit from wire 301 through switch 241, wire 353, switch 206, wire 344, brush 174, strip 148, brush 165, wire 335 and motor 123 to ground 304. (It should be noted that if the solution should be in tank 59 at the time switch 206 closes this circuit would include switch 251 instead of 241, and the positions of switches S1, S2, F3 and F5 as well as that of valves 56, 57, 67 and 68 would be reversed.)

The motor 123 rotates drum 121 until the brushes 150 to 165 make contact along line C—C when the circuit through motor 123 is broken by the extension 149 leaving brush 174 and coming to rest in contact with brush 173. Solenoids 215 and 224 remain energized but all other previously existing circuits are now broken as strips 130, 135, 139, 142 and 143 move out of contact with brushes 152, 156, 160, 162 and 163, respectively. Therefore, all previously open valves close, the pawl 202 drops, and the pump motor 120 stops. The following circuits are established: from strip 127 through brush 151, wire 320 and solenoid 101 to ground 302, opening valve 14; from strip 132 through brush 153, branched wire 322 and solenoids 103 and 104 to ground 302, opening valves 18 and 20; and from strip 144 through brush 164, wire 334 and motor 180 to ground 305. Motor 180 thus slowly rotates shaft 181, cam 183 soon closing switch 193.

With valves 14, 18 and 20 open the cation exchange unit is being backwashed until, after an appropriate interval of time, determined by the rotational speed of shaft 181 and the angular setting of cam 184 on the shaft, the stem of switch 194 drops into notch 189, closing switch 194. This establishes a circuit from supply wire 301 through switch 194, wire 343, brush 173, strip 148, brush 165, wire 335 and motor 123 to ground 304. The motor 123 then rotates drum 121 until the brushes 150 to 165 make contact along line D—D when the circuit through motor 123 is broken because the extension 149 leaves brush 173 and comes to rest in contact with brush 172. Strips 127, 132 and 144 are moved out of contact with brushes 151, 153 and 164, respectively, thus breaking all circuits. Valves 14, 18 and 20 close, and motor 180 stops. Two new circuits are established: from strip 133 through brush 154, wire 323 and solenoid 105 to ground 302, opening valve 22; and from strip 134 via brush 155 and branched wire 324 to solenoids 106 and 107, and thence to ground 302, opening valves 25 and 27.

Valves 22, 25 and 27 being open, regenerating solution from tank 12 is injected into the cation exchange unit. When the required amount of solution has been withdrawn from tank 12 float switch F1 closes and establishes a circuit from supply wire 301 through switch 231, wire 342, brush 172, strip 148, brush 165, wire 335 and motor 123 to ground 304. The motor 123 then rotates drum 121 until switches 150 to 165 make contact along line E—E when extension 149 leaves brush 172, breaking the circuit through motor 123, and comes to rest in contact with brush 171. In this position strip 134 has left brush 155, closing valves 25 and 27. Strip 133, however, remains in contact with brush 154, keeping valve 22 open. Another circuit runs from strip 128 through brush 151, wire 320 and solenoid 101 to ground 302, opening valve 14. A third circuit goes from strip 131 through brush 152, wire 321 and solenoid 102 to ground 302, opening valve 16. Still another circuit runs from strip 145 through brush 164, wire 334 and motor 180 to ground 305 so that motor 180 again rotates shaft 181, soon opening switch 194.

With valves 14, 16 and 22 open the cation exchange unit is being rinsed free of spent and excess regenerant until, after lapse of a predetermined interval of time, the stem of switch 195 drops into notch 190, closing switch 195. This establishes a circuit from supply wire 301 through switch 195, wire 341, brush 171, strip 148, brush 165, wire 335 and motor 123 to ground 304. The motor 123 now rotates drum 121 until extension 149 passes from brush 171 to brush 170 when the circuit through motor 123 is broken and the drum stops with brushes 150 to 165 making contact along line F—F. In this position only the circuit starting at strip 145 is maintained, keeping the timing motor 180 in operation which soon opens switch 195. All other previously existing circuits are broken so that valves 14, 16 and 22 are closed. A new circuit is established from strip 136 via brush 157 to branched wire 326, and thence through solenoids 109 and 110 to the ground 302.

With valves 38 and 40 thus opened the acid removal unit is backwashed until the stem of switch 196 drops into notch 191. This establishes a circuit from the supply wire 301 through switch 196, wire 340, brush 170, strip 148, brush 165, wire 335 and motor 123 to ground 304. Motor 123 then rotates the drum 121 until the brushes 150 to 165 make contact along line G—G when the circuit through motor 123 is broken as extension 149 passes from brush 170, coming to rest in contact with brush 169. In this position strips 136 and 145 have been moved out of contact with brushes 157 and 164, opening valves 38 and 40 and stopping motor 180. The following circuits are established: from strip 129 through brush 151, wire 320 and solenoid 101 to ground 302, opening valve 14; from strip 130 through brush 152, wire 321 and solenoid 102 to ground 302, opening valve 16; from strip 137 through brush 158, wire 327 and solenoid 111 to ground 302, opening valve 42; and from strip 138 through brush 159 to branched wire 328, and thence through solenoids 112 and 113 to ground 302, opening valves 45 and 47.

Valves 14, 16, 42, 45 and 47 being open, regenerating solution from tank 32 is introduced into the acid removal unit. When the required amount of regenerating solution has been withdrawn from tank 32 float switch F2 closes and establishes a circuit from supply wire 301 through switch 235, wire 339, brush 169, strip 148, brush 165, wire 335 and motor 123 to ground 304. The motor 123 rotates the drum 121 until brushes 150 to 165 make contact along line H—H when extension 149 breaks the circuit through motor 123 by passing from brush 169 to brush 168. In this position strip 138 is out of contact with brush 159, closing valves 45 and 47. The circuits starting at strips 129, 130 and 137 are maintained so that valves 14, 16 and 42 stay open. Two new circuits are established: one from strip 135 through brush 156, wire 325 and solenoid 108 to ground 302, opening valve 36; and another from strip 146 through brush 164, wire 334 and motor 180 to ground 305. Motor 180 once more rotates shaft 181, and the cam 186 shortly opens switch 196.

Now valves 14, 16, 36 and 42 are open, and spent and excess regenerant is being rinsed from the acid removal unit until, after a predetermined interval of time the cycle of regenerating operations is completed when the stem of switch 197 drops into notch 192. Thereby, a circuit is established from supply wire 301 through switch 197, wire 338, brush 168, strip 148, brush 165, wire 335 and motor 123 to ground 304. The motor 123 rotates the drum 121 until the brushes 150 to 165 contact the drum along line I—I when the circuit through the motor is broken as extension 149 passes from contact with brush 168 and comes to rest in contact with brush 167. In this position the circuits starting at strips 129, 137 and 146 are broken so that valves 14 and 42 close, and motor 180 stops. The circuits starting at strips 130 and 135 are maintained, and valves 16 and 36 thus remain open. Valve 75 is opened by a circuit passing from strip 140 through brush 160, wire 329 and solenoid 118 to ground 302. Another circuit starting at strip 142 runs through brush 162 and wire 331 to switches 216 to 218 which are still closed, solenoids 215 and 224 having remained energized all the while; from switch 216 the circuit continues through wire 356 and then branches through solenoid 116 to ground 312, and through switch member 260, terminal 262, wire 366 and solenoid 115 to ground 311, opening valves 67 and 57; from switch 218 the circuit continues via wire 360, switch 246, wire 364 and motor 120 to ground 303, placing pump 70 once more in operation.

With valves 16, 36, 57, 67 and 75 open and pump 70 in operation the condition existing immediately prior to the start of the regenerating cycle has been restored (except that the ratchet relay R is now rendered inoperative because brush 163 has no contact), and the partly treated solution retained in tank 58 is pumped from tank 58 through the treatment units into tank 59. When the level in tank 58 has dropped a small amount, switch F3 opens, deenergizing solenoids 215 and 224 which, however, does not change the positions of switches S1 and S2. When the batch of solution has been transferred to tank 59 float switch F5 closes, energizing solenoids 219 and 220 so that switch S1 opens while switch S2 closes. Thereby valves 57 and 67 are closed and valves 56 and 68 opened so that the solution is pumped from tank 59 through the treatment units into tank 58. Float switch F5 opens upon withdrawal of a small amount of solution from tank 59, deenergizing solenoids 219 and 220.

Now let it be assumed that while the solution is thus being passed a fifth time through the treatment units it reaches the desired degree of purity. The electric conductivity of the sample going to meter 50 through pipe 51 will then be low enough to cause switch 100 to close. Nothing happens immediately. However, as soon as float switch F3 closes upon transfer of the entire batch of solution to tank 58, it not only energizes solenoids 215 and 224, closing switch S1 and opening switch S2 and thereby closing valves 56 and 68 and opening valves 57 and 67, and transferring the circuit for motor 120 from switches 223 and 256 to switches 218 and 246, but also establishes a circuit from supply wire 301 through switch 241, wire 353, switch 100, wire 337, brush 167, strip 148, brush 165, wire 335 and motor 123 to ground 304. The motor 123 rotates the drum 121 once more until the brushes 150 to 165 make contact along line A—A when the circuit for motor 123 is broken by the passing of extension 149 from brush 167, coming to rest in contact with brush 166. In other words, the drum 121 has now returned to the position initially described and shown in Fig. 4 and one entire cycle of operations has been completed. All the devices, however, are not in the same position which they occupied initially, the position of switches S1, S2, F3 and F5 being reversed because the treated batch of solution is now in tank 58 whereas at the end of the preceding cycle it had been in tank 59.

With valves 14, 16, 36, 57, 67 and 77 open, a new batch of solution is admitted to tank 59 until float valve 280 closes while the treated batch is being pumped from tank 58 to the elevated storage tank 78 until the closing of switch 247 completes a circuit which energizes the motor 123. The new batch is then passed through the treatment units until, after three passes, the ratchet relay R initiates the cycle of regenerating operations following which the batch is again passed through the treatment units as many times as is necessary to obtain the desired quality of treated solution. Thus cyclic operation continues under entirely automatic control.

When the apparatus is first installed tanks 58 and 59 are both empty and float switches F3 and F5 open so that neither of valves 56 and 57 can open. To initiate operation the drum 121 is placed so that brushes 150 to 165 make contact along line A—A. This opens valves 14, 16 and 36 by circuits previously described. Then the switch member 261 of manual switch M2 is moved to the "Hand" position, establishing a circuit from supply wire 301 through member 261, terminal 263, wire 365 and solenoid 114 to ground 310 which opens valve 56. This admits solution through the treatment units to tank 58. When the level has risen to a height where float 245 closes switch 246 and opens switch 247 the switch member 261 is returned to "Auto." position, breaking the circuit and closing valve 56. Then the switch member 260 of manual switch M1 is moved to "Hand" position, establishing a circuit from supply wire 301 via switch member 260, terminal 262, wire 366 and solenoid 115 to ground 311 which opens valve 57. Float switch F5 is then observed, and as soon as it moves to closed position the switch member 260 is returned to "Auto." position, breaking the circuit so that valve 57 closes. This places in both receiving tanks the quantities of solution required for proper functioning of the control devices. Then the cam 204 of ratchet relay R is turned manually to a position in which the stem 207 is in one of the notches 205, and the drum 121 is moved to the next position in which brushes 150 to 165 make contact along the line B—B; this may be done by means of a hand crank or a manual switch of the same type as switches M1 and M2 (not shown). Coil 220 of switch S2 is now energized, closing switches 221 to 223, the ratchet relay R will take one step, and the pump 70 will run, passing the solution from tank 59 through the treatment units to tank 58, as previously described. From there on operation proceeds automatically.

In Figs. 1 and 4 only the equipment necessary for understanding the functioning of the apparatus has been shown. In practical use many refinements well known in the art of treating liquids will advantageously be employed. Thus, especially with automatic operation, it is desirable to arrange automatic refilling of the regenerating solution tanks 12 and 32, as for example, by providing storage tanks having suitably controlled connections with tanks 12 and 32, as disclosed in Staegemann Patent 2,051,155 dated August 18, 1936. The rate of flow of backwash water may be controlled by an arrangement such as described in Applebaum Patent 1,443,892 dated January 30, 1923. Other flow controlling or limiting device for regulating the flow rate of the solution being treated and of rinse water may be added. Furthermore, a control mechanism may be used which stops operation of the apparatus when the level in the storage tank 78 has reached a given height.

The ratchet relay may be modified by using a ratchet wheel having twice or four times as many teeth as the number of notches in cam 204 so that regeneration will start when a new batch of solution has been passed two or four times through the treatment units. In this connection it may be noted that the diagram of Fig. 4 is arranged especially for three passes of the water through the treating units prior to regeneration. The ratchet relay solenoid 200 is operated from the same contact strip (143) as the resetting circuit (through switch 193) of the timer T which results in the ratchet relay taking 3 steps during the regeneration process; this has no effect on the operation and causes no difficulty because the 3 steps bring the cam 204 to a position equivalent to that at which it started. If other than 3 passes are required before regeneration, the ratchet relay solenoid 200 and the resetting circuit of timer T would be energized from separate contact strips on drum 121. A device available on the market may be substituted for the ratchet relay which will close a switch after an adjustable number of impulses and then reset itself to its zero or starting position. As another alternative, a switch operated by a meter measuring the flow of solution being treated may be used. When it is desired to pass the solution but once through the treatment units prior to regeneration the solenoid 200 may be arranged for direct actuation of switch 206. It is to be noted in this connection that the total number of passes required depends not only on the nature and amount of electrolytes in the raw solution and the desired degree of purity of treated solution, but also on the desired efficiency of utilizing the available capacity of the treating materials. Thus, a given solution may be purified to a given degree in a smaller number of passes if somewhat less efficient utilization of the regenerants is acceptable. When the advantages of staggered regeneration are not needed the ratchet relay may be omitted, and the arrangement modified so that regeneration is initiated by a meter operated switch when a predetermined quantity of solution, exclusive of solution used in the steps of the regenerating cycle, has been admitted to the apparatus, or when the conductivity of the treated solution, even on repeated passage through the treatment units, is neither reduced to any substantial degree, nor has reached the desired low value.

It should be noted here that in manual operation the operator may use the analysis of the solution discharged by pipe 39 as a guide. When the concentration of electrolytes in this solution ceases to drop substantially upon repeated passage through the units without having reached the desired low value, this indicates that the capacity of the materials has been exhausted and that they should be regenerated, whereupon treatment of the batch may be completed by further passage through the treatment units.

Solenoid valves such as shown in Fig. 4 will in general be found satisfactory when both the pressure and the flow rate of the solution being treated are relatively low. For high pressures or rates of flow, valves operated by diaphragms or hydraulic pistons may be used, controlled by three or four way solenoid operated valves, or by pilot valve arrangements such as those disclosed in the Pick Patents 2,076,321 and 2,240,163, dated April 6, 1937, and April 29, 1941, respectively, and in Staegemann Patent 2,098,893 dated November 9, 1937. As a further alternative, individual or multiport valves operated by electric motors, with either manual or automatic control, may be employed, as of the type shown in Staegemann Patent 2,051,155 dated August 18, 1936.

If desired, degasifiers such as that shown in storage tank 78, may be installed above the receiving tanks so that $CO_2$ is removed from the solution being treated after each passage through the treatment units.

While not economically practical for the purification of sea water, my process will be found well suited for treating brackish water supplies such as those encountered in wells adjacent to the sea shore or to salt deposits, or waters found in the lower reaches of tidal streams, typified by the raw water used in the tests described herein.

The process according to this invention is, however, also useful for the treatment of many chemical process solutions, as shown by the following examples. An aqueous solution containing 15 per cent pentaerythritol and 0.3 per cent sodium formate may be purified by multiple demineralizing; substantially complete removal of the sodium formate, objectionable because it causes a high ash content in the finished pentaerythritol, is obtainable. Electrolytes present in sugar juices may be removed almost completely by multiple demineralizing, thus preventing the formation of excessive amounts of molasses. Multiple demineralizing may also be employed for a more thorough purification of gelatin solutions according to the process disclosed in the Holmes Patent 2,240,116 dated April 29, 1941. Aqueous solutions of glycerol from saponification reactions and of glycols from chlorohydrin hydrolysis contain substantial amounts of sodium chloride which causes difficulties in evaporating the solutions because of the formation of deposits on the heating surfaces of evaporators; by multiple demineralizing this objectionable salt may be removed. In treating chemical process solutions the arrangement of pipes and valves will, as a rule, be modified so that water is used in the various steps of the regenerating cycle.

As shown by the tests described herein, the results obtained by the stepwise reduction of the concentration of electrolytes in accordance with my process are indeed startling when compared with prior art methods, both as to quality of the treated solution and as to economy in the use of regenerants. This invention thus fills a long felt need in the purification of solutions contaminated by relatively large amounts of electrolytes, especially when substantially complete removal of the electrolytes is desired.

Modifications of either process or apparatus, other than those described or suggested herein, may be made without departing from the spirit of my invention, and reference is, therefore, made to the following claims for a definition of the scope of my invention.

What I claim is:

1. A process of demineralizing an aqueous solution of electrolytes which comprises passing a predetermined substantial volume of said solution successively through cation exchange material and acid removal material and then collecting said volume in a separate receptacle, thereafter re-passing said volume successively through said cation exchange material and said acid removal material and then collecting said volume in a second receptacle, determining the electric conductivity of said solution after it has been re-passed through said acid removal material, repeating said re-passing until the electric conductivity of said solution has dropped to a predetermined low value, and then discharging said volume to a point of use.

2. A process of demineralizing an aqueous solution of electrolytes which comprises passing a predetermined substantial volume of said solution successively through cation exchange material and acid removal material and then collecting said volume in a separate receptacle, thereafter at least once re-passing said volume successively through said cation exchange material and said acid removal material and then collecting said volume in a second receptacle, and finally discharging said volume to a point of use while simultaneously passing another predetermined volume of said solution successively through said cation exchange material and said acid removal material.

3. A process of demineralizing an aqueous solution of electrolytes which comprises at least once passing a predetermined substantial volume of said solution successively through partly exhausted cation exchange material and acid removal material and then collecting said volume in a separate receptacle, then regenerating said materials, thereafter re-passing said volume successively through said regenerated cation exchange material and acid removal material until the concentration of electrolytes in said solution has been reduced to a predetermined low value, and then discharging said volume to a point of use.

4. The process of claim 3 in which said predetermined volume of solution contains a quantity of electrolytes approximately equal to the electrolyte removal capacity, between regenerations, of said cation exchange and acid removal materials.

5. The process of claim 3 in which said predetermined volume of solution contains a quantity of electrolytes approximately equal to a proper fraction of which the numerator is unity, of the electrolyte removal capacity, between regenerations, of said cation exchange and acid removal materials.

6. A process of demineralizing an aqueous solution of electrolytes which comprises at least once passing a predetermined substantial volume of said solution successively through cation exchange material and acid removal material and then collecting said volume in a separate receptacle, then regenerating said materials, thereafter re-passing said volume successively through said regenerated cation exchange material and acid removal material, determining the electrolyte content of said solution after it has been passed through said acid removal material, repeating said re-passing until the electrolyte content of said solution has dropped to a predetermined low value, and then discharging said volume to a point of use.

7. Apparatus for demineralizing an aqueous solution of electrolytes which comprises a tank containing cation exchange material, a tank containing acid removal material, piping for said tanks including a supply pipe for the first tank, a pipe interconnecting both said tanks, and an outlet pipe for said second tank, solution receiving means, a discharge pipe connected with said outlet pipe and adapted to discharge into said solution receiving means, a service pipe and a return pipe connected with said solution receiving means and leading to a point of use and to said supply pipe, respectively, a valve in said service pipe, a valve in said return pipe, operating means for opening said valve in said service pipe and closing said valve in said return pipe, an electric conductivity meter, electrical circuits for said operating means and said meter whereby said meter is adapted to actuate said operating means, and means for passing through said meter solution flowing through said outlet pipe.

8. Apparatus for demineralizing an aqueous solution of electrolytes which comprises a tank containing cation exchange material, a tank containing acid removal material, piping for said tanks including a supply pipe for the first tank, a pipe interconnecting both said tanks, and an outlet pipe for said second tank, a pair of receiving tanks, a pair of discharge pipes connected with said outlet pipe and each adapted to discharge into one of said receiving tanks, a valve in each of said discharge pipes, a service pipe leading to a point of use and adapted to be placed into communication with at least one of said receiving tanks, a return pipe connected with said supply pipe and adapted to be placed into communication with at least the other one of said receiving tanks, and means for inducing flow through said return pipe toward said supply pipe.

9. Apparatus for demineralizing an aqueous solution of electrolytes which comprises a tank containing cation exchange material, a tank containing acid removal material, piping for said tanks including a supply pipe for the first tank, a pipe interconnecting both said tanks, and an outlet pipe for said second tank, a pair of receiving tanks, a pair of discharge pipes connected with said outlet pipe and each adapted to discharge into one of said receiving tanks, a valve in each of said discharge pipes, operating means for opening and closing said valves, volume responsive means on said receiving tanks actuating said operating means to alternately open one and close the other of said valves, a service pipe leading to a point of use, a return pipe leading from said receiving tanks to said supply pipe, and means connected with said receiving tanks for selectively inducing flow therefrom to said service pipe and to said return pipe.

10. Apparatus for demineralizing an aqueous solution of electrolytes which comprises a tank containing cation exchange material, a tank containing acid removal material, piping for said tanks including a supply pipe for the first tank, a pipe interconnecting both said tanks, and an outlet pipe for said second tank, a pair of receiving tanks, a pair of discharge pipes connected with said outlet pipe and each adapted to discharge into one of said receiving tanks, a valve in each of said discharge pipes, a pump, a suction pipe for said pump having a pair of branches each connected with one of said receiving tanks, a valve in each of said branches, operating means for opening and closing all of said valves, volume responsive means on said receiving tanks actuating said operating means to alternately open the valves in one of said discharge pipes and one of said branches and close the valves in the other one of said discharge pipes and the other one of said branches, a valved service pipe leading to a point of use, a valved return pipe connected with said supply pipe, and a discharge pipe for said pump connected with said service pipe and said return pipe.

11. Apparatus for demineralizing an aqueous solution of electrolytes which comprises a tank containing cation exchange material, a tank containing acid removal material, piping for said tanks including a supply pipe for the first tank, a pipe interconnecting both said tanks, and an outlet pipe for said second tank, a pair of receiving tanks, a pair of discharge pipes connected with said outlet pipe and each adapted to discharge into one of said receiving tanks, a valve in each of said discharge pipes, a pump, a suction pipe for said pump having a pair of branches each connected with one of said receiving tanks, a valve in each of said branches, a discharge pipe for said pump having a branch leading to a point of use and another branch connected with said supply pipe, and a valve in each of said last named branches.

12. Apparatus for demineralizing an aqueous solution of electrolytes which comprises a tank containing cation exchange material, a tank containing acid removal material, piping for said tanks including a supply pipe for the first tank, a pipe interconnecting both said tanks, and an outlet pipe for said second tank, solution receiving means, discharge means connected with said outlet pipe and adapted to discharge into said solution receiving means, a pump having a suction connection communicating with said solution receiving means and a discharge pipe connected with said supply pipe, a service pipe leading from the apparatus to a point of use, a valve in said service pipe, electrical operating means for opening and closing said valve, an electric conductivity meter, switch means operated by said meter, electrical circuits for said operating means, said meter and said switch whereby said switch is adapted to actuate said electrical operating means, and means for passing through said meter solution flowing through said outlet pipe.

13. Apparatus for demineralizing an aqueous solution of electrolytes which comprises a tank containing cation exchange material, a tank containing acid removal material, receiving means, piping for said tanks and said receiving means, means in said piping for repassing solution from said receiving means through said tanks back to said receiving means, a float switch in said receiving means, control means for said repassing means, and electrical circuits for said control means, said repassing means and said float switch whereby said float switch is adapted to energize said control means to actuate said repassing means.

14. A process of demineralizing an aqueous solution of electrolytes which comprises passing a predetermined substantial volume of said solution through partly exhausted cation exchange material and acid removal material until the concentration of electrolytes in said volume ceases to drop substantially without having reached a predetermined low value, collecting said volume in a separate receptacle, then interrupting said passing and regenerating said materials, thereafter repeating the passing of said volume until the concentration of electrolytes has reached said predetermined low value, and then discharging said volume to a point of use.

HOWARD L. TIGER.

REFERENCES CITED

The following references are of record in the file of this patent:

UNITED STATES PATENTS

| Number | Name | Date |
|---|---|---|
| 2,287,284 | Behrman | June 23, 1942 |
| 2,317,847 | Duden | Apr. 27, 1943 |
| 1,696,369 | Trewhitt et al. | Dec. 25, 1928 |
| 1,775,412 | Tannehill | Sept. 9, 1930 |
| 2,267,841 | Riley | Dec. 30, 1941 |
| 1,954,405 | Dotterweich | Apr. 10, 1934 |
| 948,725 | Freeman | Feb. 8, 1910 |
| 1,800,517 | Foster | Apr. 14, 1931 |
| 1,035,813 | Rice | Aug. 13, 1912 |
| 2,306,720 | Fender | Dec. 29, 1942 |
| 1,759,601 | Apeldorn | May 20, 1930 |
| 1,955,693 | Turner | Apr. 17, 1934 |
| 2,209,487 | Wagner | July 30, 1940 |
| 2,315,223 | Riche | Mar. 30, 1943 |
| 1,926,505 | Turner | Sept. 12, 1933 |
| 1,341,790 | Edelman | June 1, 1920 |
| 2,097,779 | Shook | Nov. 2, 1937 |
| 2,366,945 | Walker | Jan. 9, 1945 |